United States Patent [19]

Noda

[11] 4,427,162
[45] Jan. 24, 1984

[54] FISHING REEL

[75] Inventor: Hideo Noda, Sakai, Japan

[73] Assignee: Shimano Industrial Company Limited, Osaka, Japan

[21] Appl. No.: 343,169

[22] Filed: Jan. 27, 1982

[30] Foreign Application Priority Data

Jan. 31, 1981 [JP] Japan .............................. 56-13132[U]
Jan. 31, 1981 [JP] Japan .............................. 56-13133[U]

[51] Int. Cl.³ ............................................ A01K 89/01
[52] U.S. Cl. ............................................. 242/84.21 R
[58] Field of Search ................... 242/84.21 R, 84.2 G, 242/84.21 A, 84.4

[56] References Cited

U.S. PATENT DOCUMENTS 3,348,788 10/1967 Vinokur ........................ 242/84.21 R

FOREIGN PATENT DOCUMENTS 914251 6/1946 France ......................... 242/84.21 R
1299923 6/1962 France ......................... 242/84.21 R
608454 9/1948 United Kingdom ......... 242/84.21 R Primary Examiner—Billy S. Taylor
Attorney, Agent, or Firm—Stevens, Davis, Miller & Mosher

[57] ABSTRACT

A fishing reel which has a spool shaft movable in reciprocation longitudinal of a reel body and a traverse groove provided at the outer periphery of the spool shaft so that an engaging member engageable with the traverse groove rotates to allow the spool shaft to reciprocate and a rotary frame having a bail arm rotates to wind a fishing line onto a spool, and which provides an association shaft parallel to the spool shaft, the association shaft associating with a driven shaft rotating together with the rotatry frame and associating with a rotary member carrying the engaging member so as to rotate the rotary member at a different speed with respect to the driven shaft, thereby avoiding synchronization of reciprocation of the spool shaft with rotation of the rotary frame.

6 Claims, 5 Drawing Figures

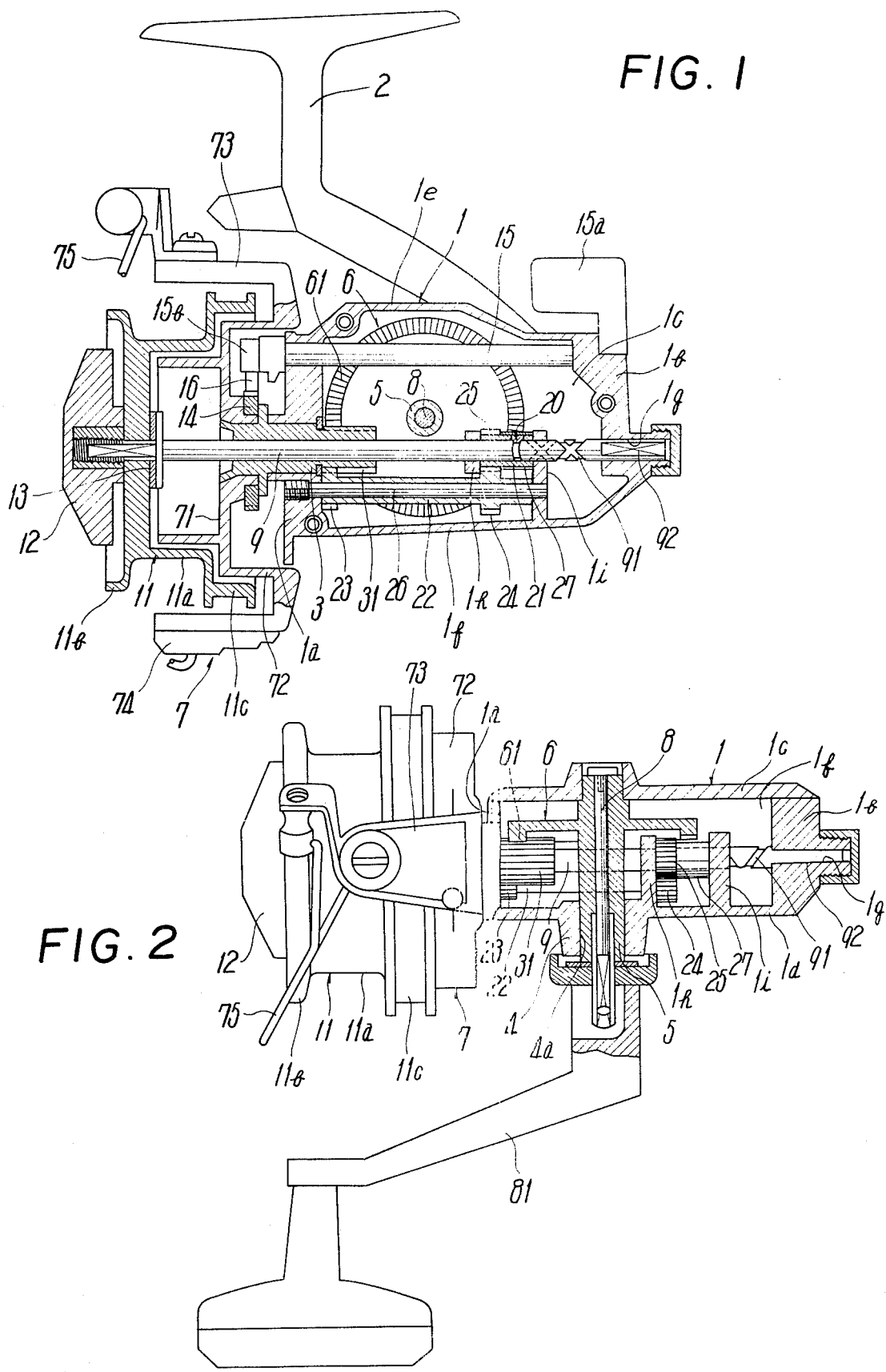

FISHING REEL

FIELD OF THE INVENTION

This invention relates to a fishing reel, and more particularly to a fishing reel having a spool shaft which carries a spool and is supported to a reel body in relation of reciprocating longitudinally thereof and a rotary frame which has a bail arm and is supported rotatably to the reel body, so that the rotary frame rotates and the spool shaft reciprocates to wind a fishing line onto the spool.

BACKGROUND OF THE INVENTION

Conventionally, a fishing reel which winds the line on the spool by rotating the rotary frame while moving the spool shaft in reciprocation is called a spinning reel and has been well-known.

The spinning reel is box-shaped to have a front wall and side walls. One through bore is provided at the front wall and insertably supports a tubular driven shaft and the spool shaft. The rotary frame is supported to one axial end of the driven shaft projecting frontward from the front wall and the spool is supported to one axial end of the spool shaft projecting frontward from the same. A drive shaft having a handle bar is supported to one side wall at a right angle with the driven shaft and spool shaft, and a transmission mechanism for transmitting rotation of the handle bar from the drive shaft to the rotary frame through the driven shaft is housed within the reel body.

The transmission mechanism comprises a master gear supported to the drive shaft and a pinion supported to the driven shaft, the pinion engaging with the master gear to transmit the rotation of the handle bar to the rotary frame with a speed increase.

A reciprocation mechanism is provided which comprises a traverse groove in the outer periphery of a part of the spool shaft within the reel body and an engaging member at a part of the driven shaft within the same, so that the engaging member rotates following the rotation of driven shaft and moves the spool shaft in reciprocation longitudinal of the reel body.

Such reciprocation mechanisn performs smooth reciprocation of the spool, but causes the rotary frame to rotate in synchronism with longitudinal reciprocation of the spool because the engaging member rotates together with the driven shaft, causing the line wound on the spool to become heaped so it is not uniform on a trunk of the spool.

Hence, the line, when drawn-out for casting, is subjected to an excessive resistance, or a heap of wound line is loosened and the line snarls, thereby reducing the casting distance.

To overcome this problem the Development Department of the assignee of this application to the inventor, has developed a fishing reel which provides ring teeth smaller in diameter than a master ring gear engageable with a pinion, an association shaft which has an association gear engageable with the smaller diameter ring teeth and is supported rotatably to the aforesaid driven shaft, and an engaging member engageable with the traverse groove and supported to the assiciation shaft, thereby avoiding synchronization of the rotation of the rotary frame with the longitudinal movement of the spool.

Such a reel, however, provides at the master gear both the larger diameter ring teeth and smaller diameter ring teeth, so that the master gear should be larger in diameter in consideration of its strength which leads to a large-sized reel body having therein the larger master gear resulting in a high manufacturing cost and an increased weight of the reel. Also, the smaller diameter ring teeth formed radially inwardly of the master gear and the association gear coaxial with the spool shaft cannot rotate at significantly different speeds in consideration of strength and size as a whole.

Furthermore, since the axis of the spool shaft intersects at a right angle with that of the drive shaft, the drive shaft cannot be journalled to both side walls, whereby the reel cannot be formed in a right- or left-hand handle type in which the handle bar is mountable onto either axial end of the drive shaft.

SUMMARY OF THE INVENTION

An object of the invention is to provide a fishing reel which has a reciprocation mechanism comprising a traverse groove and an engaging member engageable therewith and which avoids the use of two ring teeth at a master gear, but in which the rotary frame does not rotate in synchronism with the longitudinally reciprocal movement of the spool, to thereby wind a fishing line uniformly on a trunk of the spool throughout an axial length of the trunk, and which is small-sized as a whole and can shift the spool shaft with respect to the axis of the drive shaft.

The fishing reel of the invention, which has a transmission mechanism comprising a drive shaft having a master gear and a driven shaft having a pinion engageable with the master gear and has a reciprocation mechanism comprising a traverse groove at the outer periphery of the spool shaft and an engaging member engageable with the traverse groove, is provided with a rotary member carrying the engaging member and an association shaft disposed in parallel to the spool shaft, so that a first drive coupling means associates the association shaft with the driven shaft and a second drive coupling means associates the rotary member with the association shaft, whereby the rotary member rotates at a rotational speed different from the driven shaft to allow the spool shaft to reciprocate not in synchronism with rotation of the driven shaft, and in turn the rotary frame.

Therefore, since the spool can longitudinally reciprocate independently of the rotation of the rotary frame, the line can be wound on the spool uniformly throughout on the trunk of the spool.

Furthermore, the master gear can have its diameter reduced to a minimum as its ring teeth need be engageable only with the pinion, a gear ratio between the driven shaft and the rotary member is desirably changeable, and the spool shaft can be shifted from the axis of the drive shaft to thereby allow mounting of a handle shaft on both side walls of the reel body.

These and other objects of the invention will be seen by reference to the description, taken in connection with the accompanying drawings, in which:

BRIEF DESCRIPTION OF THE DRAWINGS

FIG. 1 is a longitudinally sectional side view of an embodiment of a fishing reel of the invention, FIG. 2 is a partially cutaway plan view of the FIG. 1, embodiment.

DETAILED DESCRIPTION OF THE INVENTION

Figure 3:
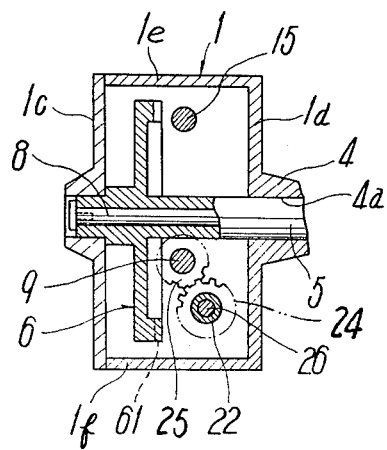
FIG. 3 is a sectional view explanatory of a positional relation of a drive shaft with a spool shaft and an association shaft in the FIG. 1 embodiment.

A typical fishing reel of the invention is shown in FIGS. 1 and 2, in which a reel body 1 is box-shaped to have a front wall 1a, a rear wall 1b, a pair of side walls 1c and 1d, an upper wall 1e, and a lower wall 1f, the upper wall 1e carrying a mounting leg 2 for a fishing rod (not shown), the front wall 1a having a through bore through which a tubular driven shaft 3 is rotatably supported, the side wall 1d having a bearing cylinder 4 having a shaft bore 4a directed perpendicularly with respect to the axis of driven shaft 3, the bearing cylinder 4 rotatably supporting a drive shaft 5 having a master gear 6.

The driven shaft 3 enters at one axial end into the reel body 1 and projects at the other axial end outwardly from the front wall 1a, the one axial end carrying a pinion 31 engageable with transmitting ring teeth 61 at one side of master gear 6, the other axial end fixedly supporting a rotary frame 7 by use of a fixing means, such as calking.

The drive shaft 5 is rotatable in association with the handle bar 8. The drive shaft 5 including the master gear 6 and the driven shaft 3 including the pinion 31, constitute a transmission mechanism for transmitting the rotation of handle bar 8 to rotary frame 7.

The driven shaft 3 also supports a spool shaft 9 which projects through the axial center of the driven shaft 3. The spool shaft 9 is larger in an axial length than the driven shaft 3 and provided at the outer periphery of one axial end portion within the reel body 1 with a traverse groove 91, at the one axial end with flat faces 92, and at the other axial end projecting from the front wall 1a with a spool 11, the flat faces 92 being fitted into a not-round bore 1g formed at the rear wall 1b, thereby restraining the spool shaft 9 from rotation and allowing it to axially move only.

The spool 11 comprises a cylindrical trunk 11a and a pair of flanges 11b and 11c and is fitted onto the other axial end of spool shaft 9 through the trunk 11a so as to be fixed by a thumbscrew 12 under a predetermined resistance through a friction plate 13.

The rotary frame 7, as shown in FIG. 1, comprises a support plate 71 having a central boss, a cylinder 72 in continuation of the outer peripheral portion of support plate 71, and a pair of support arms 73 and 74 carrying a swingable ball arm 75, the boss at support plate 71 being fitted onto an axial end of driven shaft 3 projecting outwardly from the front wall 1a, thereby fixing the rotary frame 7 to the axial end by a fixing means, such as calking.

In FIGS. 1 and 2, reference numeral 14 is an antireverse-rotation gear supported to the axial end of driven shaft 3 projecting from the front wall 1a, and 15 designates a control lever supported rotatably to the front and rear walls 1a and 1b. The control lever 15 has at one end a knob 15a and at the other end a cam 15b. An anti-reverse-rotation pawl 16 is provided between the cam 15b and the anti-reverse-rotation gear 14, and engages therewith to restrain the reverse rotation of rotary frame 7 and disengages from the gear 14 to permit the free rotation of the same.

The fishing reel of the invention constructed as foregoing is provided with a reciprocation mechanism.

In detail, the reciprocation mechanism comprises a traverse groove 91 provided at the outer periphery of spool shaft 9, a tubular rotary member 21 having an engaging member 20 engageable with the traverse groove 91, and an association shaft 22 disposed in parallel to a part of spool shaft 9 within the reel body 1. A first drive coupling means is provided between the association shaft 22 and the driven shaft 3, and a second drive coupling means is provided between the rotary member 21 and the association shaft 22, so that the rotation of driven shaft 3 is transmitted to the rotary member 21 through the association shaft 22 to allow the spool shaft 9 to axially reciprocate and the rotary member 21 rotates at a different speed with respect to the driven shaft 3.

The first and second drive coupling means in the embodiment in FIGS. 1 through 3, use transmission gears of different gear ratios to rotate the rotary member 21 at a different speed with respect to the driven shaft 3, the first drive coupling means partially utilizing the pinion 31.

Namely, the association shaft 22 in this embodiment is provided at both axial ends with a first drive coupling gear 23 and a second drive coupling gear 24, the first gear 23 engaging with the pinion 31, the second gear 24 engaging with teeth 25 provided at the outer periphery of one axial end of the rotary member 21.

The rotary member 21 is supported rotatably to the spool shaft 9 at its portion having the traverse groove 91 and is interposed between a pair of support walls 1h and 1i which are provided at the side wall 1d and extend toward the rotary member 21, thereby being restrained from axial movement.

The association shaft 22 is supported only rotatably to a shaft 26 fixed to the front wall 1a and support wall 1i. The first drive coupling gear 23 at the association shaft 22 is smaller in number of teeth than the pinion 31 to thereby rotate the association shaft 22 faster than the driven shaft 3 and the second drive coupling gear 24 is larger in number of teeth than the rotary member 21 to thereby rotate the rotary member 21 faster than the association shaft 22, and in turn the driven shaft 3, thus avoiding synchronization of the rotation of rotary frame 7 with the longitudinal reciprocation of spool 11.

In addition, the engaging member 20 comprises a stem, has at one axial end thereof an engaging portion engageable with the traverse groove 91, is inserted into a through bore at the rotary member 21, and is fixed by a resilient C-like-shaped snap ring 27, thereby being held in a condition of engaging with the traverse groove 91.

The driven shaft 3 and spool shaft 9 are shifted radially downwardly (toward the lower wall 1f of reel body 1) with respect to the axis of drive shaft 5, and the drive shaft 5 is journalled to the side walls 1c and 1d so that the handle shaft 8 which carries a handle bar 81 can be fitted into the drive shaft 5 from either axial end thereof.

This construction is advantageous in that the reel is formed into the so-called right- and left-hand handle type which can mount the handle 81 on either side of the reel body 1.

In the fishing reel of the invention constructed as abovementioned, the handle bar 81 is turned to drive the handle shaft 8 so that a driving force is transmitted therefrom to the rotary frame 7 through the drive shaft 5, master gear 6 and pinion 31, whereby the rotary frame 7 rotates to wind the line onto the trunk 11a of spool 11 through the bail arm 75. The driving force also is transmitted from the pinion 31 to the rotary member 21 through the first drive coupling gear 23, association shaft 22 and second drive coupling gear 24, so that the rotary member 21, together with the engaging member 20, rotates to axially move the spool shaft 9 having the traverse groove 91 engaging with the engaging member 20, thus longitudinally moving the spool 11. In this instance, the association shaft 22, and in turn the engaging member 20, rotates at higher speed than the rotary frame 7 integral with the driven shaft 3, thereby winding the line uniformly so it does not become heaped on the trunk 11a of spool 11 while changing the line winding position by a smaller pitch.

Also, the above construction increases a difference between the rotational speeds of the pinion 31 and rotary member 21 to further facilitates uniform winding of the line.

The association shaft 22 is disposed within a dead space of reel body 1 and is optionally located around the spool shaft 9 in a range of association therewith. Also, the master gear 6, which has the ring teeth 61 only, is made relatively smaller in diameter in comparison with a master gear provided with another set of ring teeth as conventional. Hence, the reel body 1 can be small-sized.

Figure 4:
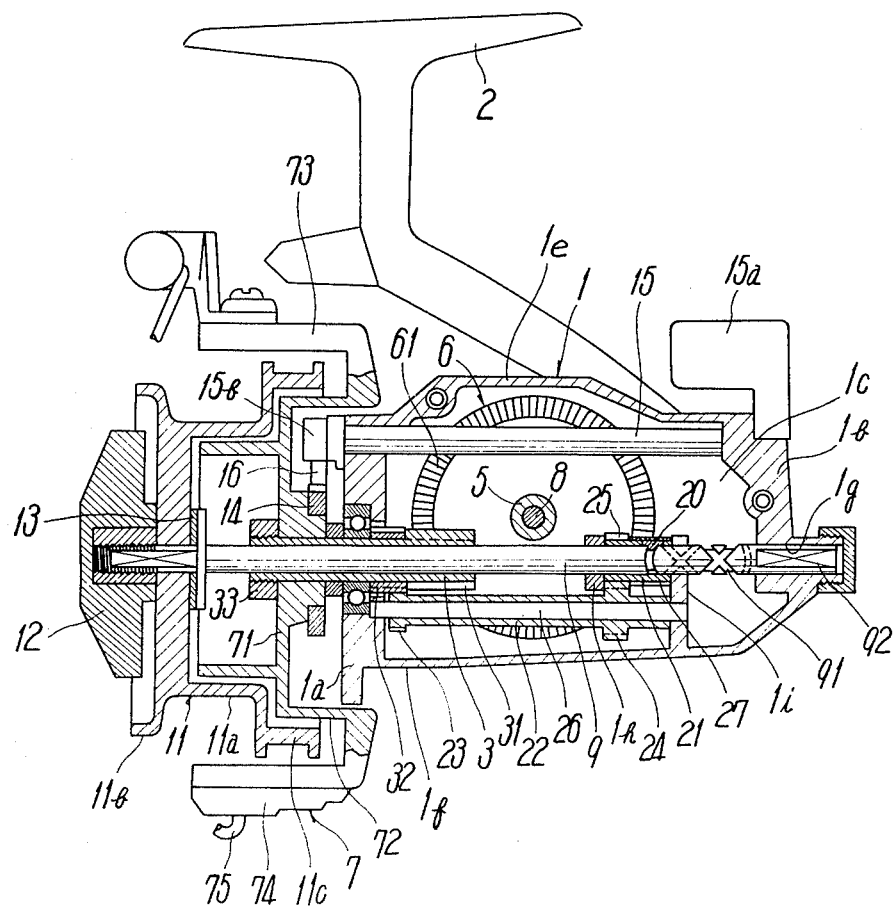
FIG. 4 is a longitudinally sectional side view of a modified embodiment of the invention.

Alternatively, a second pinion 32 separate from the pinion 31, as shown in FIG. 4, may be fitted not-rotatably onto the driven shaft 3 and engage with the first drive coupling gear 23. In addition, in FIG. 4, a lock nut 33 fixes the rotary frame 7 to the driven shaft 3.

Figure 5:
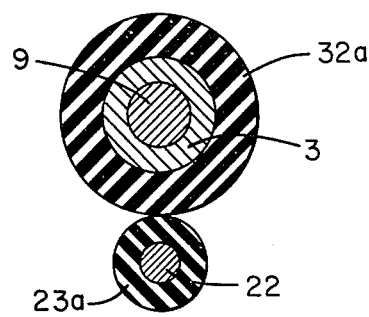
FIG. 5 is a partial sectional view of a further modification of the invention.

The first and second drive coupling means in the above embodiments may alternatively use rollers each formed of a material, such as rubber, of a larger friction factor and which engage with each other in frictional contact. FIG. 5 illustrates this construction, as applied to the first drive coupling means. Reference numeral (32a) designates a rubber roller fixed to tubular shaft (3) in place of the second pinion (32) in FIG. 4, and reference number (23a) designates a rubber roller fixed to association shaft (22) in place of the first drive coupling gear (23) in FIG. 4. The roller (23a) contacts with the roller (32a) to transmit the driving force of tubular shaft (3) to association shaft (22). Or, pulleys or sprockets may be used and associated with each other through endless belts or chains.

As seen from the above, the rotational speed of rotary member 21 is readily changeable with respect to that of driven shaft 3 due to the fact that the rotary member 21 associates with the rotary frame 7 through the association shaft 22 and first and second drive coupling means, thereby preventing the rotational speed of rotary frame 7 from synchronizing with the axially reciprocating speed of spool shaft 9. As a result, the line is wound on the trunk 11a of spool 11 uniformly so as not to be heaped.

Therefore, the reel of the invention need not provide double ring toothed portions at the master gear as previously developed, so that the master gear 6 is smaller in diameter and the association shaft 22 can be disposed within the dead space of reel body 1, thereby keeping the reel as a whole small-sized and lightweight.

Also, both the association shaft 22 and spool shaft 9 are provided to enlarge a difference betwee the rotational speeds of the driven shaft 3 and rotary member 21, thereby winding the line more uniformly on the spool 11.

Furthermore, the drive shaft 5 can be journalled to the side walls 1c and 1d because the spool shaft 9 is shifted from the axis of drive shaft 5, so that the handle shaft 8 carrying the handle bar 81 can be attached selectively to either side of the reel body 1, so that the reel is readily used as a right- or left-hand handle type reel.

Although, embodiments have been described, they are merely exemplary of the invention and are not to be construed as limiting, the invention being defined solely by the appended claims.

What is claimed is:

1. A fishing reel comprising:
   a reel body having a front wall and side walls;
   a spool shaft which is supported to said reel body in relation of being movable in reciprocation longitudinal of said reel body, projects at the axially front end forwardly from said front wall, and has a spool at said front end and a traverse groove at a portion of said spool shaft entering into said reel body;
   a tubular driven shaft which is supported rotatably to the front wall of said reel body, projects at the axially front end forwardly from said front wall, and has at said front end a rotary frame having a ball arm and at a portion of said driven shaft entering into said reel body a pinion;
   a drive shaft having a master gear engageable with said pinion; and,
   a rotary member having an engaging member engageable with said traverse groove at said spool shaft and being supported rotatably with respect to said spool shaft;
   said reel body being provided with an association shaft disposed in parallel to said entering portion of said spool shaft, a first drive coupling means provided between said association shaft and said driven shaft, and a second drive coupling means provided between said association shaft and said rotary member, so that said rotary member rotates in association with said driven shaft and at different speed with respect thereto.

2. A fishing reel according to claim 1, wherein said first drive coupling means for said association shaft and driven shaft and said second drive coupling means for said association shaft and rotary member, comprise transmission gear mechanisms respectively, so that said rotary member is rotated at a different speed with respect to said driven shaft through a different gear ratio.

3. A fishing reel according to claim 1 or 2, wherein said first drive coupling means for said driven shaft and association shaft, comprises said pinion provided at said driven shaft and a drive coupling gear engageable with said pinion, said gear being provided at said association shaft.

4. A fishing reel according to claim 1, wherein said first drive coupling means for said driven shaft and association shaft, comprises a first drive coupling member provided at said driven shaft and a second drive coupling member provided at said association shaft.

5. A fishing reel according to claim 4, wherein said first and second drive coupling members are brought into frictional contact with each other.

6. A fishing reel according to claim 4, wherein an endless association member is provided between said first and second drive coupling members.

* * * * *